United States Patent
Singh et al.

(10) Patent No.: US 10,155,901 B2
(45) Date of Patent: Dec. 18, 2018

(54) CATIONIC POLYMERS FOR FOAM FRACTURING APPLICATIONS

(71) Applicant: HALLIBURTON ENERGY SERVICES, INC., Houston, TX (US)

(72) Inventors: Dipti Singh, Kingwood, TX (US); Eli Allen Schnoor, Kingwood, TX (US); Prashant D Chopade, Kingwood, TX (US); Ali Alwattari, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 18 days.

(21) Appl. No.: 15/309,763

(22) PCT Filed: May 9, 2014

(86) PCT No.: PCT/US2014/037559
§ 371 (c)(1),
(2) Date: Nov. 8, 2016

(87) PCT Pub. No.: WO2015/171163
PCT Pub. Date: Nov. 12, 2015

(65) Prior Publication Data
US 2017/0152433 A1 Jun. 1, 2017

(51) Int. Cl.
*C09K 8/68* (2006.01)
*C09K 8/80* (2006.01)
(Continued)

(52) U.S. Cl.
CPC ............... *C09K 8/703* (2013.01); *C09K 8/68* (2013.01); *C09K 8/80* (2013.01); *E21B 43/267* (2013.01)

(58) Field of Classification Search
None
See application file for complete search history.

(56) References Cited

U.S. PATENT DOCUMENTS

| | | |
|---|---|---|
| 3,958,581 A | 5/1976 | Abegg et al. |
| 4,766,959 A | 8/1988 | Allison |
| | (Continued) | |

FOREIGN PATENT DOCUMENTS

WO 2004/058197 7/2004

OTHER PUBLICATIONS

PCT International Search Report and Written Opinion, dated Jan. 30, 2015, Appl. No. PCT/US2014/037559, "Cationic Polymers for Foam Fracturing Applications," filed May 9, 2014, 12 pgs.

*Primary Examiner* — William D Hutton, Jr.
*Assistant Examiner* — Charles R Nold
(74) *Attorney, Agent, or Firm* — Thomas Rooney; Tumey L.L.P.

(57) ABSTRACT

A method of foam fracturing a subterranean formation includes providing an fracturing foam fluid comprising an aqueous base fluid, a cationic polymer, optionally a foam surfactant comprising at least one of an amphoteric surfactant, cationic surfactant, an anionic surfactant, and combinations thereof, and sufficient gas to form a foamed fracturing fluid; and fracturing the subterranean formation with the foamed fracturing fluid. Stable fracturing foams include an aqueous base fluid, a cationic polymer, optionally a foam surfactant comprising at least one of an amphoteric surfactant, cationic surfactant, an anionic surfactant, and combinations thereof, and sufficient gas to form a foamed fracturing fluid.

10 Claims, 5 Drawing Sheets

(51) Int. Cl.
   *E21B 43/267*   (2006.01)
   *C09K 8/70*    (2006.01)

(56) References Cited

U.S. PATENT DOCUMENTS

| | | |
|---|---|---|
| 7,205,262 B2 | 4/2007 | Schwartz et al. |
| 7,422,064 B1 | 9/2008 | Yang |
| 2004/0209780 A1* | 10/2004 | Harris .................... C09K 8/602 507/117 |
| 2010/0122815 A1 | 5/2010 | Zamora et al. |
| 2012/0285694 A1 | 11/2012 | Morvan |
| 2017/0002261 A1* | 1/2017 | Mirakyan ................ C09K 8/68 |
| 2017/0158939 A1* | 6/2017 | Chen ...................... C09K 8/035 |

* cited by examiner 23    24

CATIONIC POLYMERS FOR FOAM FRACTURING APPLICATIONS

BACKGROUND

The treatment of subterranean formations penetrated by a wellbore to stimulate the production of hydrocarbons or to enhance the ability of the formation to accept injected fluids has long been known in the art. One of the most common methods is to subject the formation to a fracturing treatment. This treatment is conducted by injecting a liquid, gas, or two-phase fluid, which generally is referred to as a fracturing fluid, down the wellbore at sufficient pressure and flow rate to fracture the subterranean formation. A proppant material such as sand, fine gravel, sintered bauxite, glass beads, or the like may also be introduced into the fractures to keep the fractures at least somewhat open ("propped") once the fracturing pressure is released. Propped fractures provide larger flow channels through which an increased quantity of a hydrocarbon may flow, thereby increasing the productive rate of a well.

The rheological requirements of a fracture fluid are highly constraining. To adequately propagate fractures in the subterranean formation, a fracturing fluid should exhibit a low leakage rate of liquids into the formation during the fracturing operation. Also, the fracturing fluid should have sufficient body and viscosity to transport and deposit proppant into the cracks in the formation formed during fracturing. The fracturing fluid should readily flow back into the wellbore after the fracturing is complete and leave minimal residue that could impair permeability and conductivity of the formation. Finally, the fracturing fluid should have rheological characteristics that permit it to be formulated and pumped down the wellbore without excessive difficulty or pressure drop friction losses.

Several techniques have evolved for treating a subterranean well formation to stimulate hydrocarbon production. For example, hydraulic fracturing methods have often been used according to which a portion of a formation to be stimulated is isolated using conventional packers, or the like, and a stimulation fluid containing gels, acids, sand slurry, and the like, is pumped through the well bore into the isolated portion of the formation. The pressurized stimulation fluid pushes against the formation at a very high force to establish and extend cracks on the formation. However, the requirement for isolating the formation with packers is time consuming and considerably adds to the cost of the system.

One of the problems often encountered in hydraulic fracturing is fluid loss which for the purposes of this application is defined as the loss of the stimulation fluid into the porous formation or into the natural fractures existing in the formation. The most commonly used fracturing fluids are water-based compositions containing a hydratable high molecular weight polymeric gelling material that increases the viscosity of the fluid. Thickening the fluid reduces leakage of liquids from the fracture fissures into the formation during fracturing and increases proppant suspension capability.

However, a significant number of hydrocarbon bearing subterranean formations do not respond to conventional fracturing fluids. These problematic formations include hydrocarbon reservoirs that are under low pressure, subterranean formations that exhibit low permeability to fluid flow, and formations in which permeability is reduced when exposed to water. For example, clay in formations swells when it absorbs water that reduces permeability. Also, fracturing fluids do not readily flow back out of these difficult formations when the fracturing operation is complete; the fluids remain in the formations and tend to impede the flow of hydrocarbons to the wellbore.

Foamed fracturing fluids are known as an alternative to the conventional all-liquid fracturing fluids and can be designed to meet the desired rheological requirements and to be effective for problematical formations. Foamed fracturing fluids are media in which a relatively large volume of gas is dispersed in a relatively small volume of liquid, usually with the aid of a foaming agent that reduces the surface tension of the fluids and stabilizes small bubbles. The most commonly used gases for foamed fracture fluids, nitrogen and carbon dioxide, are noncombustible, readily available, and relatively cheap. Most commonly used foamed fracturing fluids are water based, although oil and alcohol based foams are known.

Foamed fracture fluids may be superior to conventional liquid fracturing fluids for problematic formations because foams contain less liquid than traditional fracturing fluids and thus have less liquid to retrieve after the fracturing operation is complete. Moreover, the expansion of the gas in the foamed fluid when fracturing pressure in the wellbore is relieved promotes flow of residual fracture fluid liquid back into the wellbore. Moreover, foamed fracturing fluids exhibit low liquid leakage into the formation because they inherently have low liquid concentrations, and the stable two-phase structure characteristic of foams minimizes leakage and promotes proppant transport and placement capability.

The most common foaming agents are ionic surfactants. However, ionic surfactants can have compatibility issues with both problematic formations and other additives within a foamed fracturing fluid or subsequent treatment fluid. For example, sandstone and limestone formations have negative surface charges. Thus, when a cationic foaming agent is used in a foamed fracturing operation, the cationic foaming agent may coat the surfaces of the formation leaving the formation oil-wet and/or adversely affect subsequent operations like consolidation and scale-inhibiting operations. In addition, ionic surfactants may be rendered ineffective in the presence of high salt concentrations, and thus are incompatible with brine treatment fluids.

Thus, a need exists for a foam fracturing system that can provide viscosity while stabilizing the foam structure without, or with minimal use of additional foam surfactants.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to one having ordinary skill in the art and having the benefit of this disclosure.

DETAILED DESCRIPTION

Figure 1:
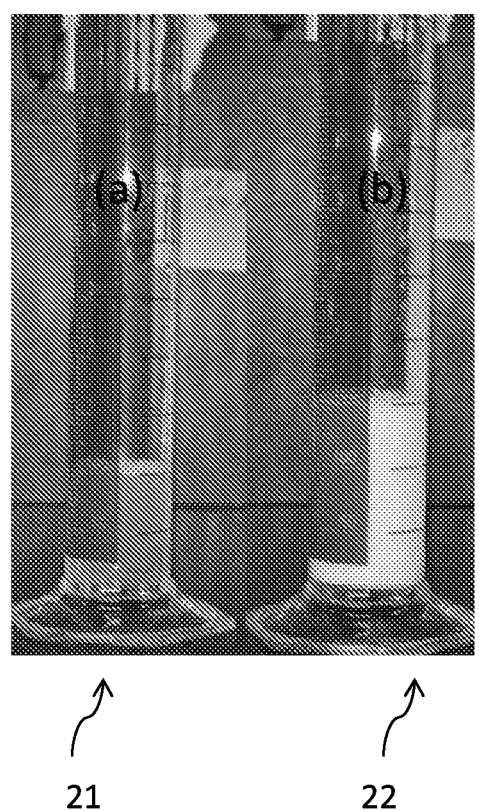
FIG. 1 shows the control sample foaming efficiency of high molecular weight cationic polymers.

The present invention generally relates to the use of foam in subterranean operations, and, more specifically, to fracturing foam fluids and methods of using these fluids in various subterranean operations.

In an embodiment, the present invention supplies a single polymer system that can provide viscosity while stabilizing a foam structure without, or with very minimal use of additional foam surfactants.

In some embodiments, the fracturing foam may be used in a method of fracturing a subterranean formation comprising: providing or using a foamed fracturing fluid including: an aqueous base fluid; a cationic polymer; optionally a foam surfactant comprising at least one of an amphoteric surfactant, cationic surfactant, anionic surfactant, and combinations thereof; and sufficient gas to form a foam. The foamed fracturing fluid is introduced into the subterranean formation under conditions effective to create at least one fracture therein. In certain embodiments, the cationic polymers include hydroxyethylcellulose. In some embodiments, the cationic polymer comprises a high molecular weight polymer and a low molecular weight polymer. In an exemplary embodiment, the ratio of high molecular weight polymer to low molecular weight polymer is 3:1. In certain embodiments, the fracturing foam fluids include no foam surfactants. In other embodiments, the foamed fracturing fluids include a foam surfactant at a concentration of about 0.005% to about 2% w/w of the aqueous base fluid. In an exemplary embodiment, the quality of the resulting foam is from about 5% gas volume to about 99% gas volume. In further embodiments, wherein the gas is selected from the group consisting of nitrogen, carbon dioxide, air, methane, helium, argon, and any combination thereof. In some embodiments, the foamed fracturing fluid further comprises a proppant.

In another embodiment, the fracturing foam may be used in a method of fracturing a subterranean formation comprising: providing or using a foamed fracturing fluid including: an aqueous base fluid; a cationic polymer; optionally a foam surfactant comprising at least one of an amphoteric surfactant, cationic surfactant, anionic surfactant, and combinations thereof; proppant; and sufficient gas to form a foam. The foamed fracturing fluid is introduced into the subterranean formation under conditions effective to create at least one fracture therein and at least a portion of the proppant is deposited into the fracture. In certain embodiments, the cationic polymers include hydroxyethylcellulose. In some embodiments, the cationic polymer comprises a high molecular weight polymer and a low molecular weight polymer. In an exemplary embodiment, the ratio of high molecular weight polymer to low molecular weight polymer is 3:1. In certain embodiments, the fracturing foam fluids include no foam surfactants. In other embodiments, the foamed fracturing fluids include a foam surfactant at a concentration of about 0.005% to about 2% w/w of the aqueous base fluid. In an exemplary embodiment, the quality of the resulting foam is from about 5% gas volume to about 99% gas volume. In further embodiments, wherein the gas is selected from the group consisting of nitrogen, carbon dioxide, air, methane, helium, argon, and any combination thereof.

In an additional embodiment, a stable fracturing foam includes an aqueous base fluid, a cationic polymer, optionally a foam surfactant comprising at least one of an amphoteric surfactant, cationic surfactant, an anionic surfactant, and combinations thereof, and sufficient gas to form a foamed fracturing fluid.

Cationic Polymers

In an embodiment, the present invention utilizes cationic polymers to stabilize foam systems. In some embodiments, cationic polymers provide improved viscosity for the external phase of a foam. In certain embodiments, derivatized cellulose, for example hydroxyl alkyl cellulose or polymers with cellulose backbone and cationic groups, are added through quaternization. Additionally cationic galacto-mannose may also be used as a cationic polymer in some embodiments.

In an exemplary embodiment, cationic hydroxyethylcellulose (cationic-HEC) is utilized. Other examples of useful cationic polymers include, but are not limited to, quaternary hydroxyl alkyl cellulose (Soft CAT-DOW, Sensomer™-Merquat-Lubrizol), cationic polygalactomannan gum are also available as trade name of Jaguar; amine treated cationic starches; ethanol, 2,2',2"-nitrilotris-, polymer with 1,4-dichloro-2-butene and N,N,N',N'-tetra methyl-2-butene-1,4-diamine; poly[bis(2-chloroethyl) ether-alt-1,3-bis[3-(dimethylamino)propyl]urea]; hydroxyethyl cellulose dimethyl diallylammonium chloride copolymer; diallyldimethylammonium chloride-hydroxyethyl cellulose copolymer; copolymer of acrylamide and quaternized dimethylammoniumethyl methacrylate; poly(diallyldimethylammonium chloride); copolymer of acrylamide and diallyldimethylammonium chloride; quaternized hydroxyethyl cellulose; copolymer of vinylpyrrolidone and quaternized dimethylaminoethyl methacrylate; acrylamide-dimethylaminoethyl methacrylate methyl chloride copolymer; copolymer of vinylpyrrolidone and quaternized vinylimidazole; copolymer of acrylic acid and diallyldimethylammonium chloride; copolymer of vinylpyrrolidone and methacrylamidopropyl trimethylammonium; poly(acrylamide 2-methacryloxyethyltrimethyl ammonium chloride); poly(2-methacryloxyethyltrimethylammonium chloride); terpolymer of acrylic acid, acrylamide and diallyldimethylammonium chloride; poly[oxyethylene(dimethylimino)ethylene (dimethylimino)ethylene dichloride]; terpolymer of vinylcaprolactam, vinylpyrrolidone, and quaternized vinylimidazole; polyquaternium-47 terpolymer of acrylic acid, methacrylamidopropyl trimethylammonium chloride, and methyl acrylate; guar hydroxypropyltrimonium chloride; poly(ethyleneimine) (PEI); poly-L-(lysine) (PLL); poly[2-(N,N-dimethylamino)ethyl methacrylate](PDMAEMA) and chitosan; cellulose, 2-(2-hydroxy-3-(trimethylammonium)propoxy)ethyl ether chloride, and combinations thereof.

In some embodiments, the cationic polymer comprises a combination of two or more cationic functional groups, such as, trimethylammonium chloride, quaternized vinylimidazole.

In certain embodiments, the molecular weight of the cationic polymer is varied to achieve higher foam quality while preserving a long half-life. In another embodiment, the high molecular weight polymer has a molecular weight of about 500K to about 2.5 million. In a preferred embodiment, the high molecular weight polymer has a molecular weight of about 600K. In other embodiments, the low molecular weight polymer has a molecular weight of about 2K to about 400K. In a preferred embodiment, the low molecular weight polymer has a molecular weight of about 2K. In some embodiments, a 3:1 mixture of high molecular weight to low molecular weight polymer was utilized.

Foam Surfactants

In an embodiment, the present invention utilizes foam surfactants to increase the quality of the stabilize foams and add stability to the foams. In some embodiments, the foam surfactants are selected from an amphoteric surfactant, cationic surfactant, anionic surfactant, and combinations thereof Useful foam surfactants include betaines, sultaines, and imidazolinium such as cocamidopropyl betaine and sodium lauraminopropionate, SLS and other fatty alcohol ether sulfates including SLES, polyoxyethylene fatty alcohols and polyoxyethylene sorbitol esters and alkanolamides, sulfosuccinates (e.g. disodium laureth sulfosuccinate), phospholipids, glycolipid, sodium lauryl sulfoacetate, and combinations thereof. In certain embodiments, combinations of surfactants, i.e., co-surfactants, work together to provide a useful foam surfactant.

In exemplary embodiments, the foam surfactant is present in the foamed fracturing fluid at a concentration of about 0.005% to about 2% w/w of the aqueous base fluid.

In embodiments where the foam surfactant is "optional," the foam fracturing fluid of the invention does not contain any purposely added, virgin foam surfactants. While some foam surfactants may enter the fluid in the field, for example due to mixing of recycled fluids with the fluid of the invention, the fluid of the invention is tolerant of such insubstantial quantities, that is in quantities less than about 0.005% w/w of the aqueous base fluid.

Aqueous Base Fluids

Aqueous base fluids suitable for use in the treatment fluids of the present invention may comprise fresh water, saltwater (e.g., water containing one or more salts dissolved therein), brine (e.g., saturated salt water or produced water), seawater, produced water (e.g., water produced from a subterranean formation) or combinations thereof. Generally, the water may be from any source, provided that it does not contain components that might adversely affect the stability and/or performance of the first treatment fluids or second treatment fluids of the present invention. In certain embodiments, the density of the aqueous base fluid can be adjusted, among other purposes, to provide additional particulate transport and suspension in the treatment fluids used in the methods of the present invention. In certain embodiments, the pH of the aqueous base fluid may be adjusted (e.g., by a buffer or other pH adjusting agent), among other purposes, to activate a crosslinking agent and/or to reduce the viscosity of the first treatment fluid (e.g., activate a breaker, deactivate a crosslinking agent). In these embodiments, the pH may be adjusted to a specific level, which may depend on, among other factors, the types of gelling agents, acids, and other additives included in the treatment fluid. One of ordinary skill in the art, with the benefit of this disclosure, will recognize when such density and/or pH adjustments are appropriate.

Gas

In some embodiments, the gas is selected from the group consisting of nitrogen, carbon dioxide, air, methane, helium, argon, and any combination thereof. In some embodiments, the quality of the foamed fracturing fluid may range from a lower limit of about 5%, 10%, 25%, 40%, 50%, 60%, or 70% gas volume to an upper limit of about 99%, 90%, 80%, 75%, 60%, or 50% gas volume, and wherein the quality of the foamed fracturing fluid may range from any lower limit to any upper limit and encompass any subset between the upper and lower limits.

Proppants

In some embodiments, a foamed fracturing fluid may comprise a plurality of proppant particulates. Proppant particulates suitable for use in the present invention may comprise any material suitable for use in subterranean operations. Suitable materials for these particulates include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, resin coated sand, and any combination thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and any combination thereof. The mean particulate size generally may range from about 2 mesh to about 400 mesh on the U.S. Sieve Series; however, in certain circumstances, other mean particulate sizes may be desired and will be entirely suitable for practice of the present invention. In particular embodiments, preferred mean particulates size distribution ranges are one or more of $6/12$, $8/16$, $12/20$, $16/30$, $20/40$, $30/50$, $40/60$, $40/70$, or $50/70$ mesh. It should be understood that the term "particulate," as used in this disclosure, includes all known shapes of materials, including substantially spherical materials, fibrous materials, polygonal materials (such as cubic materials), and combinations thereof. Moreover, fibrous materials, that may or may not be used to bear the pressure of a closed fracture, may be included in certain embodiments of the present invention. In some embodiments, the proppant particulates may be present in the first treatment fluids of the present invention in an amount ranging from a lower limit of about 0.5, 1, or 5 pounds per gallon ("ppg") to an upper limit of about 30, 25, 20, 15, or 10 ppg of the foamed fracturing fluid, and wherein the amount of proppant particulates may range from any lower limit to any upper limit and encompass any subset between the upper and lower limits.

Fluid Additives

In some embodiments, a foamed fracturing fluid may optionally comprise an additive including, but not limited to, a salt; an inert solid; a fluid loss control agent; an emulsifier; a dispersion aid; a corrosion inhibitor; an emulsion thinner; an emulsion thickener; a viscosifying agent; a surfactant; a particulate; a lost circulation material; a second foaming agent; a pH control additive; a breaker; a biocide; a crosslinker; a stabilizer; a chelating agent; a scale inhibitor; a mutual solvent; an oxidizer; a reducer; a friction reducer; a clay stabilizing agent; a proppant; a gelling agent; and any combination thereof.

Fracturing

In the present invention, generally, a zone refers to an interval of rock along a wellbore that is differentiated from surrounding rocks based on hydrocarbon content or other features, such as perforations or other fluid communication with the wellbore, faults, or fractures. A treatment usually involves introducing a treatment fluid into a well. As used herein, a treatment fluid is a fluid used in a treatment. Unless the context otherwise requires, the word treatment in the term "treatment fluid" does not necessarily imply any particular treatment or action by the fluid. If a treatment fluid is to be used in a relatively small volume, for example less than about 200 barrels, it is sometimes referred to in the art as a slug or pill. As used herein, a treatment zone refers to an interval of rock along a wellbore into which a treatment fluid is directed to flow from the wellbore. Further, as used herein, into a treatment zone means into and through the wellhead and, additionally, through the wellbore and into the treatment zone.

As used herein, into a well means introduced at least into and through the wellhead. According to various techniques known in the art, equipment, tools, or well fluids can be directed from the wellhead into any desired portion of the wellbore. Additionally, a well fluid can be directed from a portion of the wellbore into the rock matrix of a zone.

In various embodiments, systems configured for delivering the treatment fluids described herein to a downhole location are described. In various embodiments, the systems can comprise a pump fluidly coupled to a tubular, the tubular containing the polymerizable aqueous consolidation compositions and/or the water-soluble polymerization initiator compositions, and any additional additives, disclosed herein.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

After the introduction of the full amount of the calculated or estimated volume of foamed fracturing fluid necessary to fracture the formation and optionally transport the desired quantity of proppant material into the created fracture, the wellbore may be shut-in for a period of time sufficient to permit stabilization of the subterranean formation. In some embodiments, the wellbore is shut-in for a period of time to permit the formation to at least partially close upon the proppant material and stabilize the fracture volume. The shut-in period can be from several minutes to in excess of about 12 hours and, preferably, is in the range of from about 0.5 to 2 hours. After the subterranean formation has stabilized, the wellbore may be opened under controlled conditions and the pressure drop in the wellbore causes the foam to expand toward the wellbore. The foamed fracturing fluid then moves from the formation into the wellbore and exits the wellbore at the surface. The expanding gas may carry a substantial portion of the liquids present in the fracturing area from the formation thereby leaving the formation and wellbore clean and ready for the commencement of production.

The methods and compositions of the present invention may be suitable for use in nearly all subterranean formations. In some embodiments, the foamed fracturing fluid may be particularly well suited for use in a formation with charged surfaces or with water sensitivity like swelling or sloughing shales, salt formations, sandstone formations, limestone formations, and coal formations. In some embodiments, the subterranean formation may have a bottom hole static temperature greater than about 200° F. In some embodiments, the subterranean formation may have a bottom hole static temperature less than about 300° F. In some embodiments, the subterranean formation may have a bottom hole static temperature ranging from about 80° F. to about 300° F.

Figure 5:
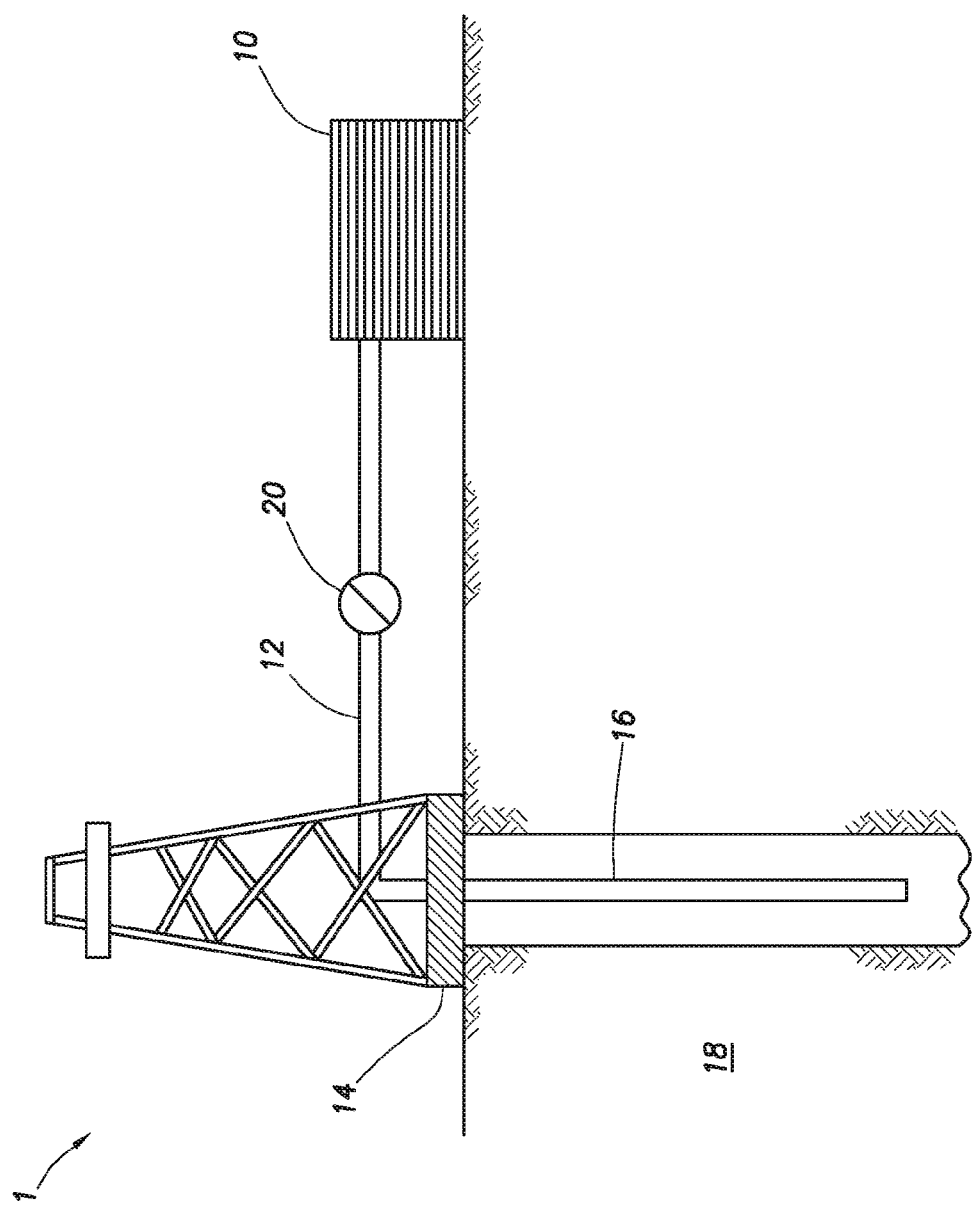
FIG. 5 shows an illustrative example of an apparatus useful for treating a subterranean formation with the fracturing foam compositions of the invention.

FIG. 5 shows an illustrative schematic of a system that can deliver treatment fluids of the embodiments disclosed herein to a downhole location, according to one or more embodiments. It should be noted that while FIG. 5 generally depicts a land-based system, it is to be recognized that like systems may be operated in subsea locations as well. As depicted in FIG. 5, system 1 may include mixing tank 10, in which a treatment fluid of the embodiments disclosed herein may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 5 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 5, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 5.

The invention having been generally described, the following examples are given as particular embodiments of the invention and to demonstrate the practice and advantages hereof. It is understood that the examples are given by way of illustration and are not intended to limit the specification or the claims to follow in any manner.

EXAMPLES

Fluid Preparation and Experiments

In a typical experiment cationic polymer was hydrated (50 lbs/1000 gal) followed by mixing of the 100 mL gel in a high speed wearing blender at 12000 rpm for 10 sec. In all the experiments, the amount of polymer was kept constant, to get comparative foam stability. Foams stability is measured by the time required for half the volume of fluid used to generate the foam to settle out (foam half-life). Foam half-lives were recorded to investigate the effect of molecular weight on the stability of the resulting foam. Foam quality was calculated using Equation 1:

$$\text{Foam quality} = (1 - (\text{Fluid Volume}/\text{Foam Volume})) * 100\% \qquad \text{Equation 1}$$

FIG. 1 shows control cationic polymer foaming efficiency. An approximately 35% quality stable foam was generated with a foam half-life of 45 minutes using a ((50 lbs/1000 gal)=6 g/L) gel loading (base gel viscosity is approximately 49 cP). FIG. 1 shows a 50 lbs/1000 gal higher molecular weight cationic polymer before mixing 21, and after mixing 22 for 10 sec in a Wearing blender at 12,000 rpm. Lowering the gel loading ((10 lbs/1000 gal)=1.2 g/L) of cationic polymer showed lower foam stability (foam half-life=2 minutes) compared to 50 lbs/1000 gal cationic polymer, along with lowering the base gel viscosity (approximately 8 cP). These results demonstrate that increasing the concentration of cationic polymer increases the viscosity of the resulting foam and the foam stability as well.

Figure 2:
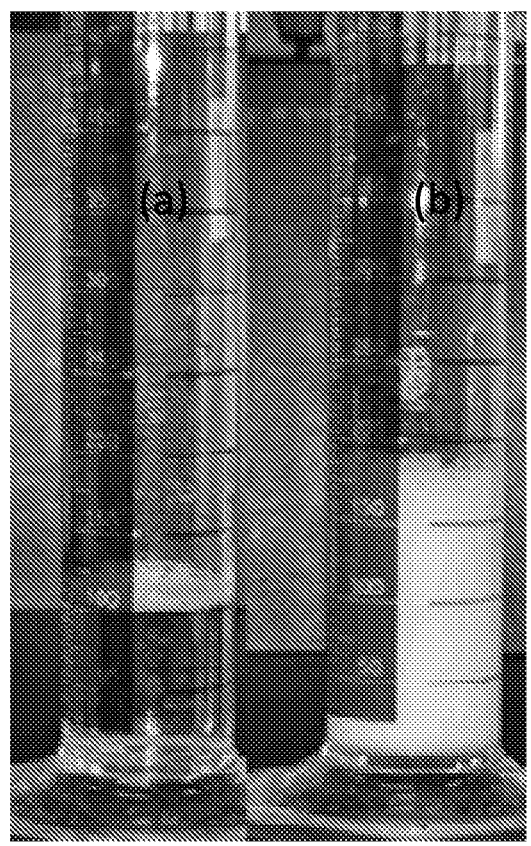
FIG. 2 shows the control sample foaming efficiency of low molecular weight cationic polymers.

FIG. 2 shows a 50 lbs/1000 gal lower molecular weight cationic polymer before mixing 23, and after mixing 24 for 10 sec in a Wearing blender at 12,000 rpm. The lower molecular weight cationic polymer (50 lbs/1000 gal) generated fine textured, approximately 45% quality foam; however, foam stability was lower than the higher molecular weight polymer. Furthermore, a dramatically shorter half-life (approximately 4 minutes) was observed with a lower molecular weight cationic polymer.

Figure 3:
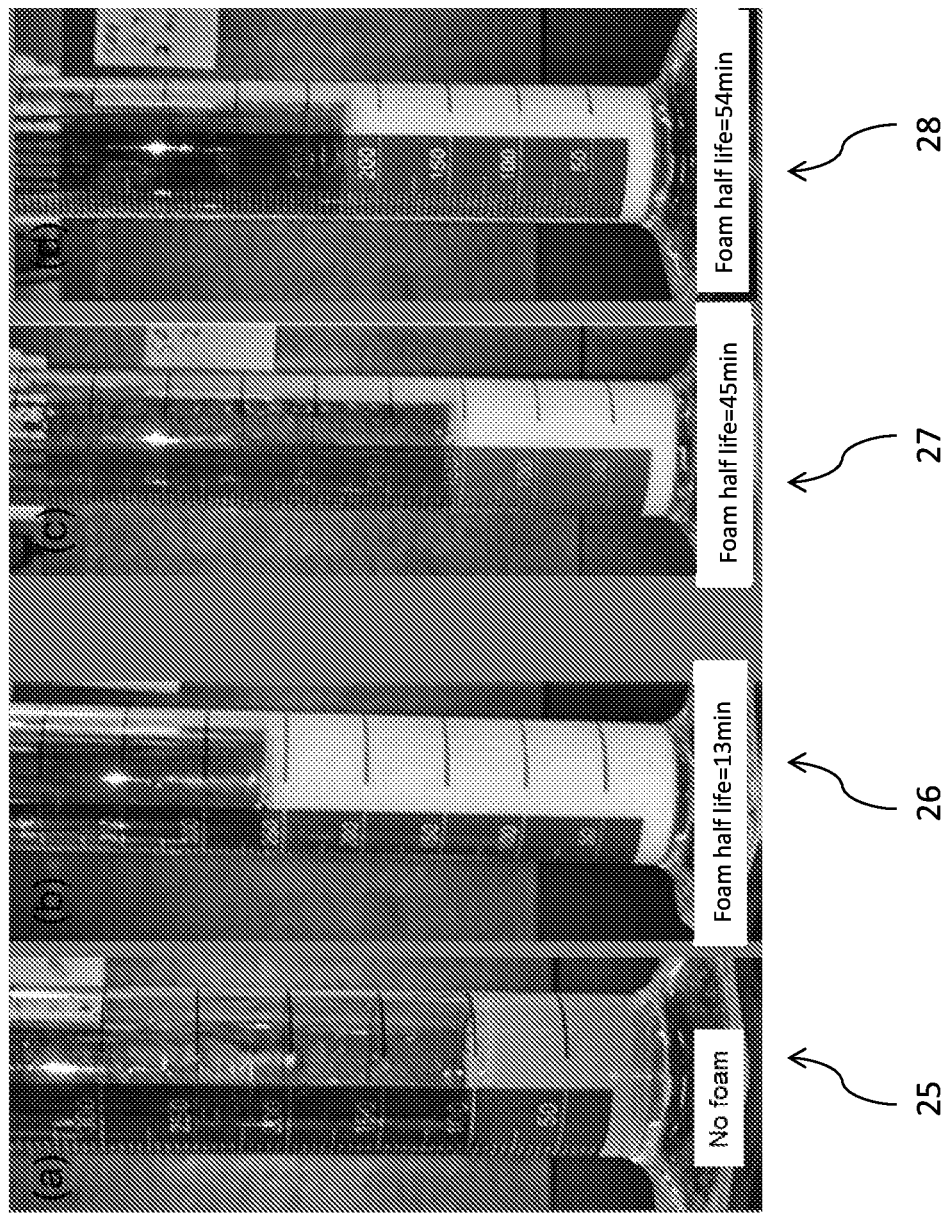
FIG. 3 shows the foam stability of a metal crosslinkable polysaccharide and a cationic polymer with and without the presence of a foaming stabilizer.

Increasing the gel loading of lower molecular weight cationic polymer resulted in greater foam stability. A gel loading of 80 lbs/1000 gal (base gel viscosity approximately 25 cP) generated approximately 45% quality foam while increasing the foam half-life to about 8 min. It was assumed that a lower molecular weight polymer would have more surfactant-like characteristics, but these experiments showed how the higher molecular weight can not only add additional viscosity, but foam stability as well. Foam stability of a base polymer (a metal crosslinkable polysaccharide available from Halliburton Energy Services, Inc., Houston, Tex.) (40 lbs/1000 gal) (6 g/L) system and cationic polymer was also tested in presence of foaming stabilizer (HC-2™). FIG. 3 demonstrates the foam stability of the base polymer and cationic polymer with HC-2 after mixing at 12,000 rpm in the following combinations: (a) base polymer without HC-2 stabilizer 25, (b) base polymer with 6 gpt HC-2 stabilizer 26, (c) cationic polymer without HC-2 stabilizer 27 and (d) cationic polymer with 2 gpt HC-2 stabilizer 28. The addition of 6 gal/1000 gal (6 ml/L) HC-2™ (foaming surfactant) to WG-39 resulted in about 60 quality foam with a half-life of 13 minutes. However, adding only 2 gal/1000 gal (2 ml/L) of HC-2 to the cationic polymer resulted in about 55 quality foam with a half-life of 54 minutes compared to a half-life of 45 minutes without HC-2. HC-2™ is an amphoteric surfactant that is also available from Halliburton Energy Services.

The lower molecular weight cationic polymer did seem to allow for slightly higher foam qualities though, so it was hypothesized that mixing the higher molecular weight with a small amount of the lower molecular weight cationic polymer would improve foam quality. A 3:1 mixture of higher molecular weight to low molecular weight polymer (gel loading of mixture=50 lbs/1000 gal) was tested and yielded a slightly higher foam quality while preserving a long half-life. This cationic blend was tested in foam loop to achieve quantitative data on the cationic polymer and results were compared with the base polymer (40 lbs/1000 gal).

The fluids were prepared in 500 mL samples and loaded into the entire volume of the foam rheometer. The fluid was then sheared at a rate of about 1000 s$^{-1}$ with the application of 1000 psi N$_2$ gas. Fluid was slowly removed from the rheometer to a mass scale. The fluid was assumed to have the density of water (1 g/mL) so the foam quality of the loop was calculated from the mass of the scale. Once the foam reached the desired quality, the shear rate was lowered to 170 s$^{-1}$.

Figure 4:
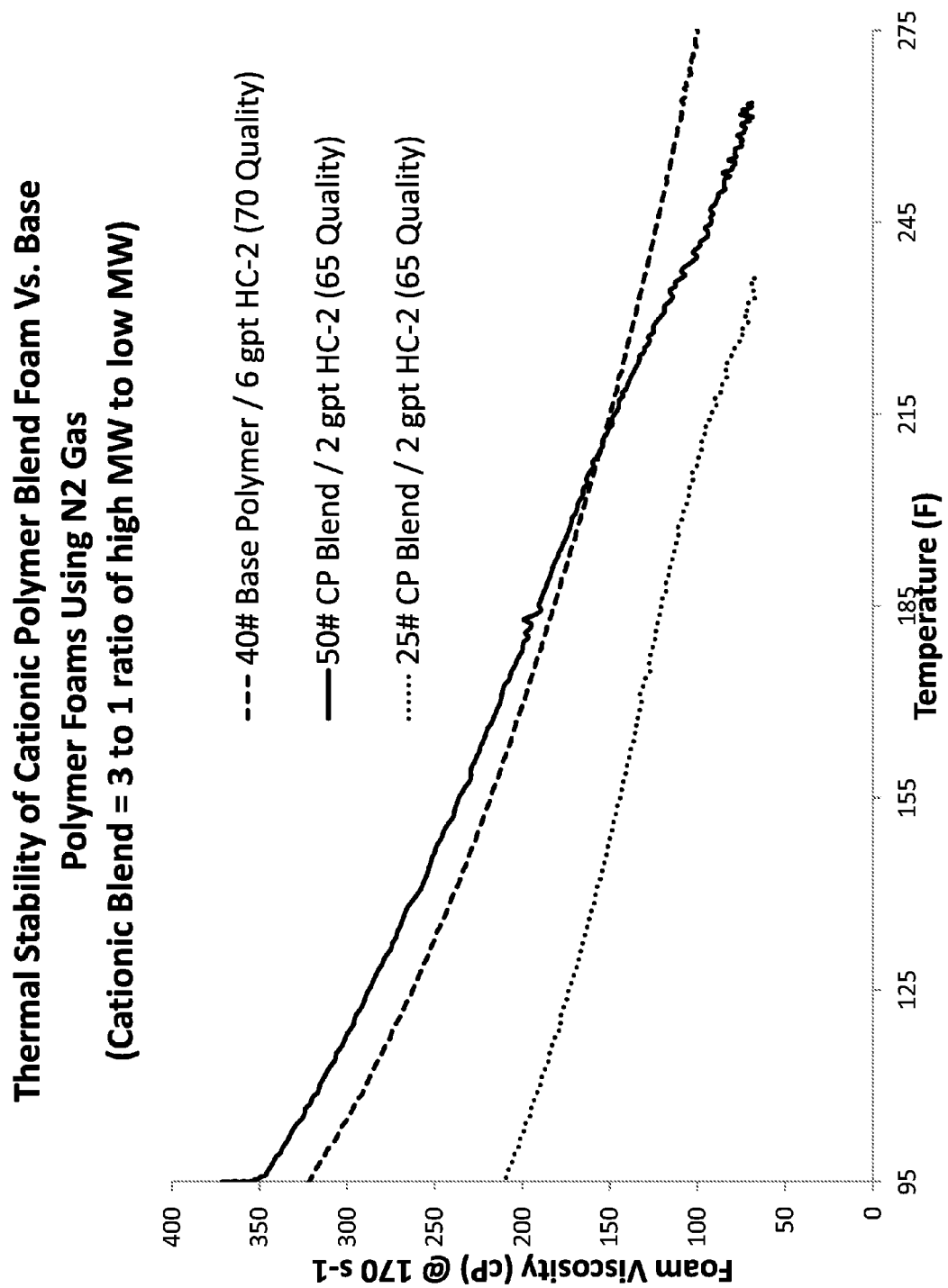
FIG. 4 shows the thermal stability of cationic polymer blend foams versus metal crosslinkable polysaccharide foams.

At this point the oven was turned on and the heat ramp was set to 300° F. This was done to investigate the heat stability of the resulting foams. As the temperature increases, foams become increasingly unstable. Resulting experiments are shown in FIG. 4, which shows the quantitative foam stability of the cationic polymer compared to the base polymer. Foams are generally considered capable of proppant transport at viscosities above 100 cP at 170 s$^{-1}$. The 50 lbs/1000 gal cationic polymer blend showed heat stability well above 200° F. with only 2 gal/1000 gal of HC-2 ™. It is recommended that for temperatures above 200° F., about 6 to about 10 gal/1000 gal HC-2 may be used in the foam systems. The blend of cationic polymers possess intrinsic foaming properties which stabilize foam, so it requires dramatically less foaming surfactant to generate high quality heat stable foams.

As seen in the examples above, the fracturing foam fluids of the present invention have improved foam quality, heat stability, and rheological properties. The resulting fracturing foams provide viscosity for the external phase of the foam and allow for the use of very low concentrations of foaming surfactants to improve the quality and stability of foams.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Embodiments disclosed herein include:

A: A method of fracturing a subterranean formation comprising: providing or using a foamed fracturing fluid including: an aqueous base fluid, a cationic polymer, optionally a foam surfactant comprising at least one of an amphoteric surfactant, cationic surfactant, anionic surfactant, and combinations thereof, and sufficient gas to form a foam. The foamed fracturing fluid is introduced into the subterranean formation under conditions effective to create at least one fracture therein.

B: A method of fracturing a subterranean formation comprising: providing or using a foamed fracturing fluid including: an aqueous base fluid, a cationic polymer, optionally a foam surfactant comprising at least one of an amphoteric surfactant, cationic surfactant, anionic surfactant, and combinations thereof, proppant, and sufficient gas to form a foam. The foamed fracturing fluid is introduced into the subterranean formation under conditions effective to create at least one fracture therein and at least a portion of the proppant is deposited into the fracture.

C: A stable fracturing foam includes an aqueous base fluid, a cationic polymer, optionally a foam surfactant comprising at least one of an amphoteric surfactant, cationic surfactant, an anionic surfactant, and combinations thereof, and sufficient gas to form a foamed fracturing fluid.

Each of embodiments A, B, and C may have one or more of the following additional elements in any combination: Element 1: wherein the cationic polymer comprises at least one of hydroxyethylcellulose, quaternary hydroxyl alkyl cellulose, cationic polygalactomannan gum; amine treated cationic starches; ethanol, 2,2',2"-nitrilotris-, polymer with 1,4-dichloro-2-butene and N,N,N',N'-tetramethyl-2-butene-1,4-diamine; poly[bis(2-chloroethyl) ether-alt-1,3-bis[3-(dimethylamino)propyl]urea]; hydroxyethyl cellulose dimethyl diallylammonium chloride copolymer; diallyldimethylammonium chloride-hydroxyethyl cellulose copolymer; copolymer of acrylamide and quaternized dimethylammoniumethyl methacrylate; poly(diallyldimethylammonium chloride); copolymer of acrylamide and diallyldimethylammonium chloride; quaternized hydroxyethyl cellulose; copolymer of vinylpyrrolidone and quaternized dimethylaminoethyl methacrylate; acrylamide-dimethylaminoethyl methacrylate methyl chloride copolymer; copolymer of vinylpyrrolidone and quaternized vinylimidazole; copolymer of acrylic acid and diallyldimethylammonium chloride; copolymer of vinylpyrrolidone and methacrylamidopropyl trimethylammonium; poly(acrylamide 2-methacryloxyethyltrimethyl ammonium chloride); poly(2-methacryloxyethyltrimethylammonium chloride); terpolymer of acrylic acid, acrylamide and diallyldimethylammonium chloride; poly[oxyethylene(dimethylimino)ethylene (dimethylimino)ethylene dichloride]; terpolymer of vinylcaprolactam, vinylpyrrolidone, and quaternized vinylimidazole; polyquaternium-47 terpolymer of acrylic acid, methacrylamidopropyl trimethylammonium chloride, and methyl acrylate; guar hydroxypropyltrimonium chloride; poly(ethyleneimine) (PEI); poly-L-(lysine) (PLL); poly[2-(N,N-dimethylamino) ethyl methacrylate](PDMAEMA) and chitosan; cellulose, 2-(2-hydroxy-3-(trimethylammonium)propoxy)ethyl ether chloride, and combinations thereof. Element 2: wherein the cationic polymer comprises at least two cationic functional groups. Element 3: wherein the foamed fracturing fluid includes no foam surfactants. Element 4: wherein the foamed fracturing fluid comprises at least one of an amphoteric surfactant, cationic surfactant, anionic surfactant, and combinations thereof. Element 5: wherein the foamed fracturing fluid comprises a cationic surfactant. Element 6: wherein the foam surfactant is present in the foamed fracturing fluid at a concentration of about 0.005% to about 2% w/w of the aqueous base fluid. Element 7: wherein the cationic polymer comprises a high molecular weight polymer and a low molecular weight polymer. Element 8: wherein the high molecular weight polymer has a molecular weight of about 500K to about 2.5 million. Element 9: wherein the low molecular weight polymer has a molecular weight of about 2K to about 400K. Element 10: wherein the ratio of high molecular weight polymer to low molecular weight polymer is 3:1. Element 11: wherein the quality of the foam is from about 5% gas volume to about 99% gas volume. Element 12: wherein the gas is selected from the group consisting of nitrogen, carbon dioxide, air, methane, helium, argon, and any combination thereof. Element 13: wherein the foamed fracturing fluid further comprises a proppant. Element 14: wherein the foam surfactants are at least one selected from betaines, sultaines, and imidazolinium such as cocamidopropyl betaine and sodium lauraminopropionate, SLS and other fatty alcohol ether sulfates including SLES, polyoxyethylene fatty alcohols and polyoxyethylene sorbitol esters and alkanolamides, sulfosuccinates (e.g. disodium laureth sulfosuccinate), phospholipids, glycolipid, sodium lauryl sulfoacetate, and combinations thereof. Element 15: wherein the foam surfactants are co-surfactants.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A method of fracturing a subterranean formation comprising:
   providing a foamed fracturing fluid including:
   an aqueous base fluid;
   a cationic polymer, wherein the cationic polymer comprises a high molecular weight hydroxyl alkyl cellulose and a low molecular weight hydroxyl alkyl cellulose, wherein the high molecular weight hydroxyl alkyl cellulose has a molecular weight of about 500K to about 2.5 million, wherein the low molecular weight hydroxyl alkyl cellulose has a molecular weight of about 2K to about 400K;
   a foam surfactant, wherein the foam surfactant comprises at least one surfactant selected from the group consisting of a betaine, a sultaine, imidazolinium, a polyoxyethylene fatty alcohol, a polyoxyethylene sorbitol ester, an alkanolamide, a sulfosuccinates, a phospholipids, glycolipid, sodium lauryl sulfoacetate, and combinations thereof, wherein the foam surfactant is present in the foamed fracturing fluid at a concentration of about 0.005% to about 2% w/w of the aqueous base fluid; and
   sufficient gas to form a foam; and
   introducing the foamed fracturing fluid into the subterranean formation under conditions effective to create at least one fracture therein.

2. The method of claim 1, wherein the cationic polymer further comprises at least one of hydroxyethylcellulose, quaternary hydroxyl alkyl cellulose, hydroxyethyl cellulose dimethyl diallylammonium chloride copolymer; diallyldimethylammonium chloride-hydroxyethyl cellulose copolymer; quaternized hydroxyethyl cellulose; cellulose, and combinations thereof.

3. The method of claim 1, wherein the cationic polymer comprises at least two cationic functional groups.

4. The method of claim 1, wherein the ratio of high molecular weight polymer to low molecular weight polymer is 3:1.

5. The method of claim 1, wherein the quality of the foam is from about 5% gas volume to about 99% gas volume.

6. The method of claim 1, wherein the gas is selected from the group consisting of nitrogen, carbon dioxide, air, methane, helium, argon, and any combination thereof.

7. The method of claim 1, wherein the foamed fracturing fluid further comprises a proppant.

8. A method comprising:
   combining an aqueous base fluid; a cationic polymer, wherein the cationic polymer comprises a high molecular weight hydroxyl alkyl cellulose and a low molecular weight hydroxyl alkyl cellulose, wherein the high molecular weight hydroxyl alkyl cellulose has a molecular weight of about 500K to about 2.5 million, wherein the low molecular weight hydroxyl alkyl cellulose has a molecular weight of about 2K to about 400K, and proppant with sufficient gas to form a foamed fracturing fluid;
   introducing the foamed fracturing fluid into a subterranean formation under conditions effective to create or enhance at least one fracture in at least a portion of the subterranean formation; and
   depositing at least a portion of the proppant into the fracture; and
   wherein the foamed fracturing fluid comprises no foam surfactant.

9. The method of claim 8, wherein the ratio of high molecular weight polymer to low molecular weight polymer is 3:1.

10. The method of claim 8, wherein the quality of the foam is from about 5% gas volume to about 99% gas volume.

* * * * *